United States Patent [19]

Jang

[11] Patent Number: 5,266,870
[45] Date of Patent: Nov. 30, 1993

[54] STRAY EMISSION PREVENTION CIRCUIT FOR CATHODE RAY TUBE

[75] Inventor: Hyung I. Jang, Seo-ku, Rep. of Korea

[73] Assignee: Gold Star Co., Ltd., Seoul, Rep. of Korea

[21] Appl. No.: 946,125

[22] Filed: Sep. 17, 1992

[30] Foreign Application Priority Data

Sep. 19, 1991 [KR] Rep. of Korea ............... 16432/1991

[51] Int. Cl.$^5$ ...................... H01J 29/70; G09G 1/04; H04N 5/63
[52] U.S. Cl. .................................. 315/411; 315/380; 315/409; 358/190
[58] Field of Search ............... 315/408, 409, 410, 411, 315/380; 358/190, 220, 223

[56] References Cited

U.S. PATENT DOCUMENTS 4,689,684  8/1987  Inashima et al. ..................... 358/190
4,723,167  2/1988  Griffey ................................. 358/190

Primary Examiner—Gregory C. Issing
Attorney, Agent, or Firm—Finnegan, Henderson, Farabow, Garrett & Dunner

[57] ABSTRACT

A stray emission prevention circuit for a system having a cathode ray tube including a charging and discharging section for applying a system power supply voltage upon power-on of the system to charge with a constant voltage and for discharging the charged voltage upon power-off of the system, and a switching section for forming an open circuit between a high voltage unit of the cathode ray tube and a ground upon the power-on of the system and forming a closed circuit therebetween upon the power-off of the system to discharge the residual high voltage in the cathode ray tube, the circuit being provided on a circuit board of the system.

5 Claims, 4 Drawing Sheets

F I G. 5a
F I G. 5b
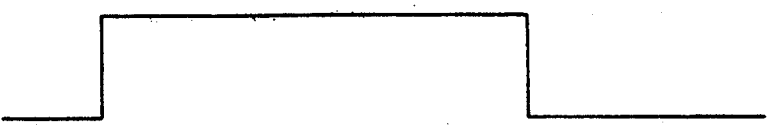
F I G. 5c
F I G. 6
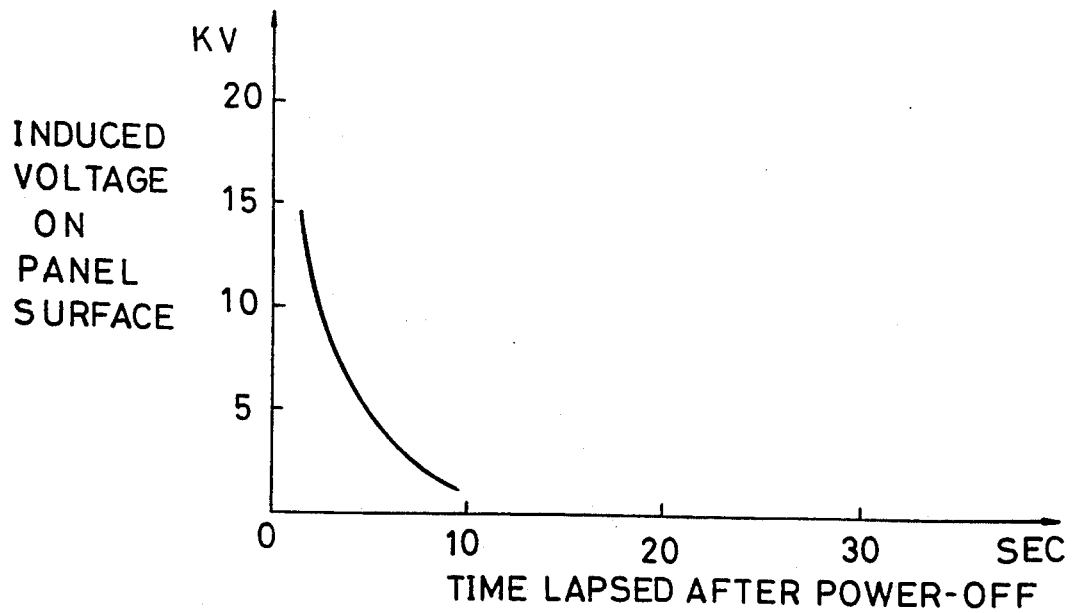

STRAY EMISSION PREVENTION CIRCUIT FOR CATHODE RAY TUBE

BACKGROUND OF THE INVENTION

1. Field of the Invention

The present invention relates in general to a cathode ray tube, and more particularly, to a stray emission prevention circuit for a cathode ray tube.

2. Description of the Prior Art

It is well known in the art that a cathode ray tube is an essential component in a television receiver or a monitor.

Construction and operation of a conventional cathode ray tube will hereinafter be described briefly with reference to FIGS. 1 and 2.

FIG. 1 is a view illustrating the construction of the conventional cathode ray tube. The cathode ray tube comprises a neck 13 and a convergence device 7 disposed in the neck 13, which performs fine convergence alignment of paths of three electron beams corresponding respectively to red (R), green (G) and blue (B) color signals. An electron gun 10 is also provided to scan the three electron beams therefrom, the paths of which are finely aligned.

The convergence device 7 consists of a static convergence permanent magnet for aligning the convergence of the electron beams at the center of a screen and a dynamic convergence coil for aligning the convergence of the electron beams at the peripheral portion of the screen. The convergence device 7 allows the three electron beams to simultaneously pass through corresponding apertures of a shadow mask 3 over the whole of the screen, the shadow mask 3 being fixed to a frame 11.

The three electron beams are then deflected at a desired angle in every direction by a deflection yoke 6 which is fixedly attached to a funnel 2. The deflection yoke 6 determines the deflection direction and deflection angle of the electron beams in response to a signal which is applied thereto from the outside, such as, for example, a saw tooth wave signal. After passing through the corresponding slots of the mask 3 fixed to the frame 11, the deflected electron beams impinge on phosphors 4 which are coated on the inner surface of a panel 1, thereby to bring out the corresponding colors. In other words, the three electron beams simultaneously pass through the corresponding apertures of the shadow mask 3 at the deflection angle and then impinge on the phosphors 4 at the individual different angles since they pass through the corresponding apertures in the individual different directions. Because red, green and blue color phosphors constitute a unit phosphor, the impinging three electron beams bring out various colors at the corresponding phosphor positions on the screen in accordance with the impinging directions and intensities thereof. For this reason, the shadow mask 3 may be referred to as a dichroic electrode.

Also provided on the upper portion of the funnel 2 is an anode cap 12 to which an anode voltage is applied as a drive voltage to the cathode ray tube. Upon application of a high voltage of about 30 KV or the anode voltage to the anode cap 12, the applied high voltage causes the three electron beams scanned from the electron gun 10 to be strongly sucked toward the panel 1 and then to impinge on the phosphors 4, since the three electron beams are of negative electrons.

The high voltage of about 30 KV through the anode cap 12 is applied to an anode electrode G4 of the electron gun 10 through a graphite and a getter 8, which are coated on the inner surface of the cathode ray tube. The getter 8 is disposed in the cathode ray tube for the purpose of increasing vacuum level in the cathode ray tube. The getter 8 has about 300 mg of barium, which absorbs gas molecules such as, for example, hydrogen, nitrogen, carbon dioxide, carbon and etc. in the cathode ray tube, thereby to increase the vacuum level in the cathode ray tube. As mentioned above, the getter 8 acts to apply therethrough to the anode electrode G4 the high voltage of 30 KV which is applied through the anode cap 12.

Unlike the voltage to the anode electrode G4, voltages to the other electrodes in the electron gun 10, i.e., control grid G1, cathode K, screen grid G2 and focus grid G3 and to a heater H are separately applied through corresponding terminals.

The voltages necessary to the respective electrodes in the actual operation are as follows:
cathode K: 100–180 V
control grid G1: 0–100 V
screen grid G2: 300–700 V
focus grid G3: 4–6 KV
anode G4: 20–30 KV On the other hand, an inner shield 5 is fixedly attached to the frame 11 in the cathode ray tube in order to prevent the scanned electron beams from being influenced by a terrestrial magnetism. The inner shield 5 acts to screen the terrestrial magnetism, thereby to avoid degradation of color purity.

Noticeably, stray electrons may be generated in the conventional cathode ray tube because of alien substances incoming during a manufacturing process of the cathode ray tube and stuck on the components of the cathode ray tube. In other words, the alien substances react with the residual high voltage of the anode electrode G4 which may be present upon power-off of the television receiver or monitor, resulting in generation of the stray electrons. The generated stray electrons then impinge on the phosphors 4. This results in unnecessary luminescence of the phosphors 4. This phenomenon is called stray emission.

In accordance with the manufacturing process of the conventional cathode ray tube, the alien substances are burned up by carrying out a knocking process in an aging process. This is performed for the purpose of preventing the generation of the stray electrons although the residual high voltage of the anode electrode G4 is present upon power-off of the television receiver or monitor. The aging process is applied for activation of thermionic emission from the electron gun. Namely, joule heat is generated by applying the voltage to the heater H to heat it and then applied to the cathode K layer of oxide, thereby causing the thermions (negative electrons) to be emitted from the cathode K layer. The emitted thermions are focused and accelerated by the electrodes of the electron gun 10 and then arrive at the phosphors 4.

Also, the knocking process applies the high voltage into the cathode ray tube to burn up the alien substances.

However, the conventional cathode ray tube has a disadvantage as follows. For the purpose of complete removal of the alien substances in the cathode ray tube by the knocking process, it is necessary to apply a very high voltage into the cathode ray tube. There is, however, a limit to raising the high voltage. That is, raising the voltage very high causes a discharge between magnetic poles (not shown) of the electron gun 10, which has a bad affect on the cathode K. For this reason, in the manufacturing process of the cathode ray tube, a proper high voltage must be considered for the knocking process as well as to remove the alien substances in the cathode ray tube. In result, some of the alien substances may remain in the cathode ray tube and react with the residual high voltage which is present upon power-off of the television receiver or monitor, resulting in the stray emission phenomenon on the screen.

FIG. 2 is a graph illustrating a natural discharge of the high voltage of 30 KV applied to the anode cap in the cathode ray tube is with the lapse of time after power-off of a system having the cathode ray tube, such as the television receiver or monitor. From this figure, it can be seen that it takes the high voltage of 30 KV a long time to naturally discharge completely.

SUMMARY OF THE INVENTION

The present invention has been made in view of the above problem, and it is an object of the present invention to provide a stray emission prevention circuit for a cathode ray tube which is capable of instantaneously discharging a high voltage remaining on an anode electrode in the cathode ray tube upon power-off of a system having the cathode ray tube, so that stray emission phenomenon on a screen can be prevented, the circuit being provided on a circuit board of the system.

In accordance with the present invention, in a system having a cathode ray tube, a stray emission prevention circuit for the cathode ray tube is provided comprising charging and discharging means for inputting a system power supply voltage upon power-on of the system to charge with a constant voltage and discharging the charged voltage upon power-off of the system, respectively and switching means for forming an open circuit between a high voltage unit of the cathode ray tube and a ground upon the power-on of the system and forming a closed circuit therebetween in response to the charged voltage being discharged, as a drive voltage, upon the power-off of the system to discharge the residual high voltage in the cathode ray tube.

BRIEF DESCRIPTION OF THE DRAWINGS

The above and other objects, features and advantages of the present invention will be more clearly understood from the following detailed description taken in conjunction with the accompanying drawings, in which:

FIG. 5a FIG. 5b FIG. 5c is a timing chart of signals from components in the circuit in FIG. 4 in accordance with the present invention; and FIG. 6 is a graph illustrating the natural discharge of the residual high voltage in the cathode ray tube with the lapse of time after power-off of a system having the cathode ray tube, in accordance with the present invention.

DETAILED DESCRIPTION OF THE PREFERRED EMBODIMENT

Figure 3:
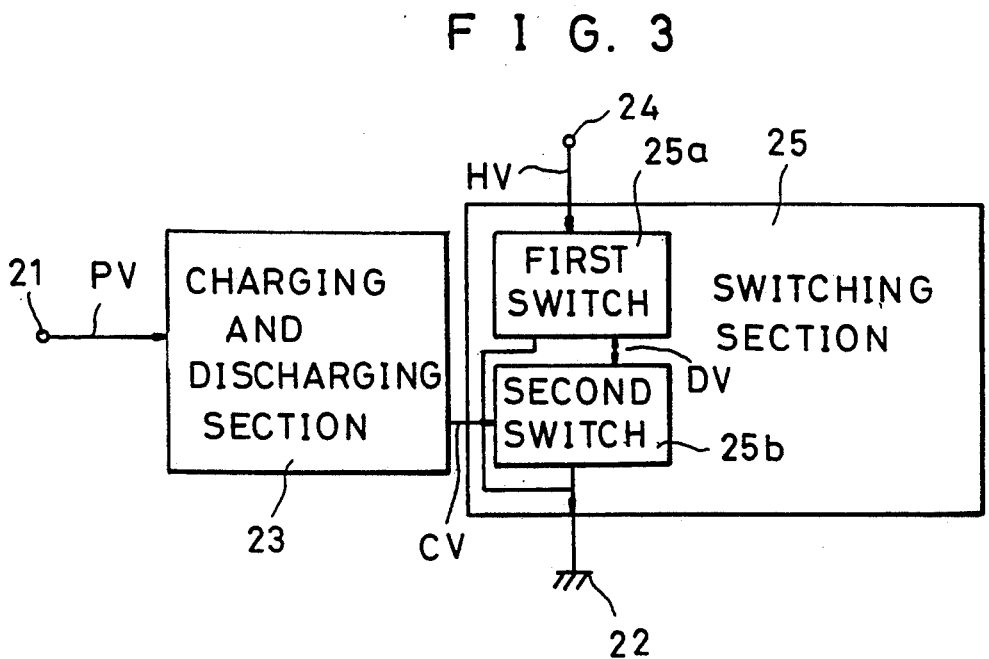
FIG. 3 is a block diagram of a stray emission prevention circuit for a cathode ray tube in accordance with the present invention.

Referring to FIG. 3, a block diagram of a stray emission prevention circuit for a cathode ray tube is shown in accordance with the present invention. As shown in this figure, in a system having the cathode ray tube 20 (see FIG. 4), the stray emission prevention circuit for the cathode ray tube 20 includes a charging and discharging section 23 connected to a power supply 21 of the system. The charging portion inputs a voltage PV from the power supply 21 upon power-on or activation of the system to charge with a constant voltage CV. The discharging portion discharges the charged voltage CV toward a ground 22 upon power-off or deactivation of system. The system include a switching section 25 for forming an open circuit between a high voltage unit 24 of the cathode ray tube 20 and the ground 22 upon the power-on of the system and forming a closed circuit therebetween upon the power-off of the system to discharge the residual high voltage HV in the cathode ray tube 20 toward the ground 22. The circuit is provided on a circuit board of the system.

The switching section 25 includes a first switch 25a for forming the closed circuit between the high voltage unit 24 of the cathode ray tube 20 and the ground 22 upon application of a drive voltage DV thereto and forming the open circuit therebetween when the drive voltage DV is not applied thereto. The switching section 25 includes a second switch 25b for forming an open circuit between the charging and discharging section 23 and the first switch 25a upon the power-on of the system and forming a closed circuit therebetween upon the power-off of the system to apply the charged voltage CV as the drive voltage DV to the first switch 25a.

Figure 4:
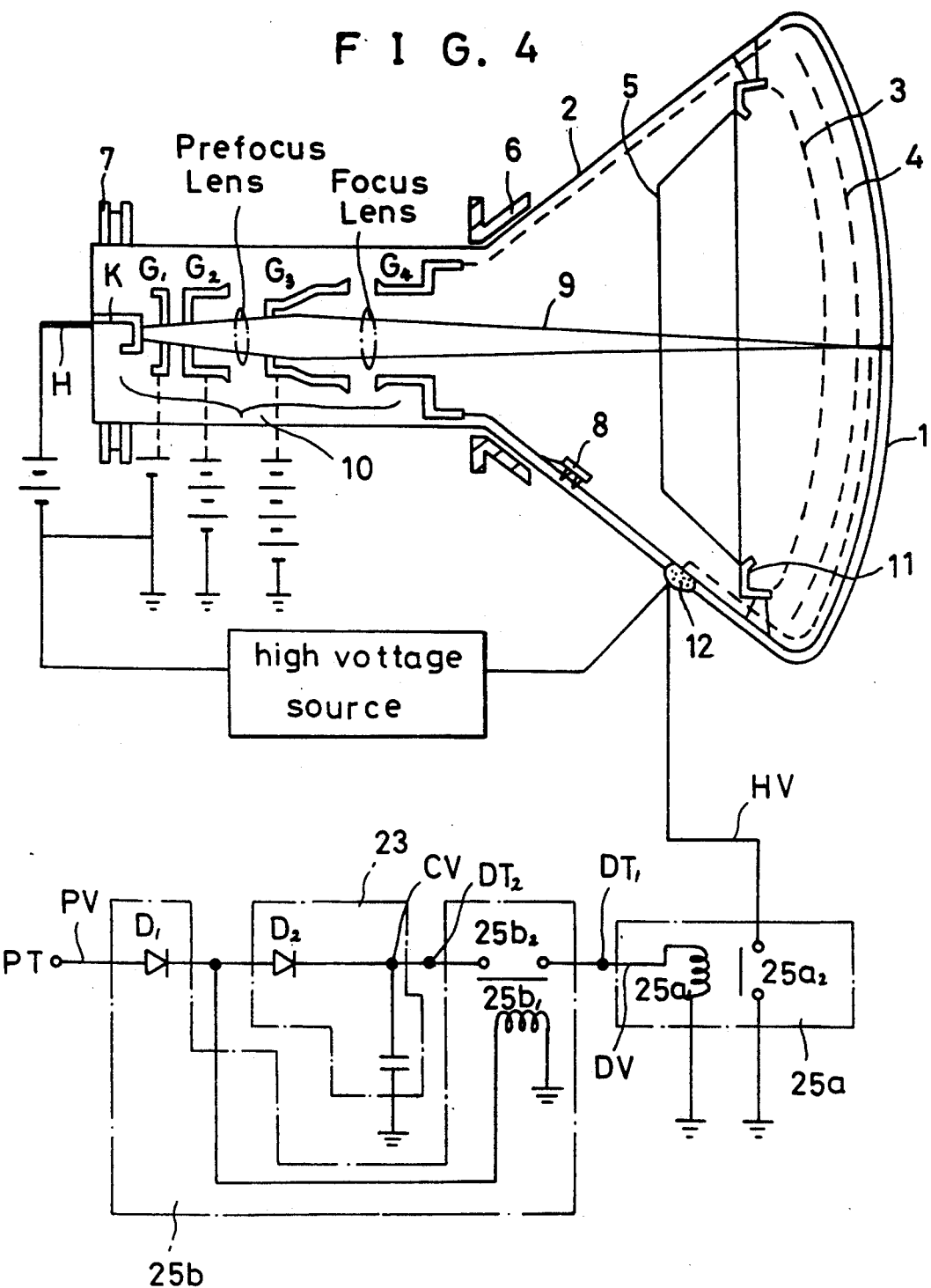
FIG. 4 is a detailed circuit diagram of the circuit in FIG. 3 in accordance with the present invention.

Referring to FIG. 4, there is shown a detailed circuit diagram of the circuit in FIG. 3 in accordance with the present invention. As shown in FIG. 4, the first switch 25a is provided with a relay coil 25a1 and a relay contact 25a2 connected between the anode cap 12 or the high voltage unit 24 (FIG. 3) of the cathode ray tube 20 and the ground. Since the residual high voltage in the cathode ray tube 20 is considerably high upon the power-off of the system, the relay coil 25a1 must have a high endurance against the residual high voltage to discharge it.

Also as shown in FIG. 4, the second switch 25b in FIG. 3 is provided with a diode D1 having its anode connected to a power supply terminal PT of the system, a relay coil 25b1 connected between a cathode of the diode D1 and the ground, and a relay contact 25b2 connected between a terminal DT1 and a terminal DT2 to which the charged voltage CV is applied.

Also, the charging and discharging section 23 includes a diode D2 connected between the cathode of the diode D1 and the terminal DT2, and a capacitor C1 connected between a cathode of the diode D2 and the ground.

Although the relay contact 25a2 in the first switch 25a is connected only to the anode cap 12 to which the highest voltage is typically applied in the cathode ray tube 20, it may be connected to another high voltage unit, such as the focus grid G3, as well as the anode cap 12. It can be seen herein that stray emission phenomenon on a screen can be prevented although the relay contact 25a2 in the first switch 25 is connected only to the anode cap 12 to which is applied the high voltage resulting in generation of an induced voltage on the panel 1.

Figure 1:
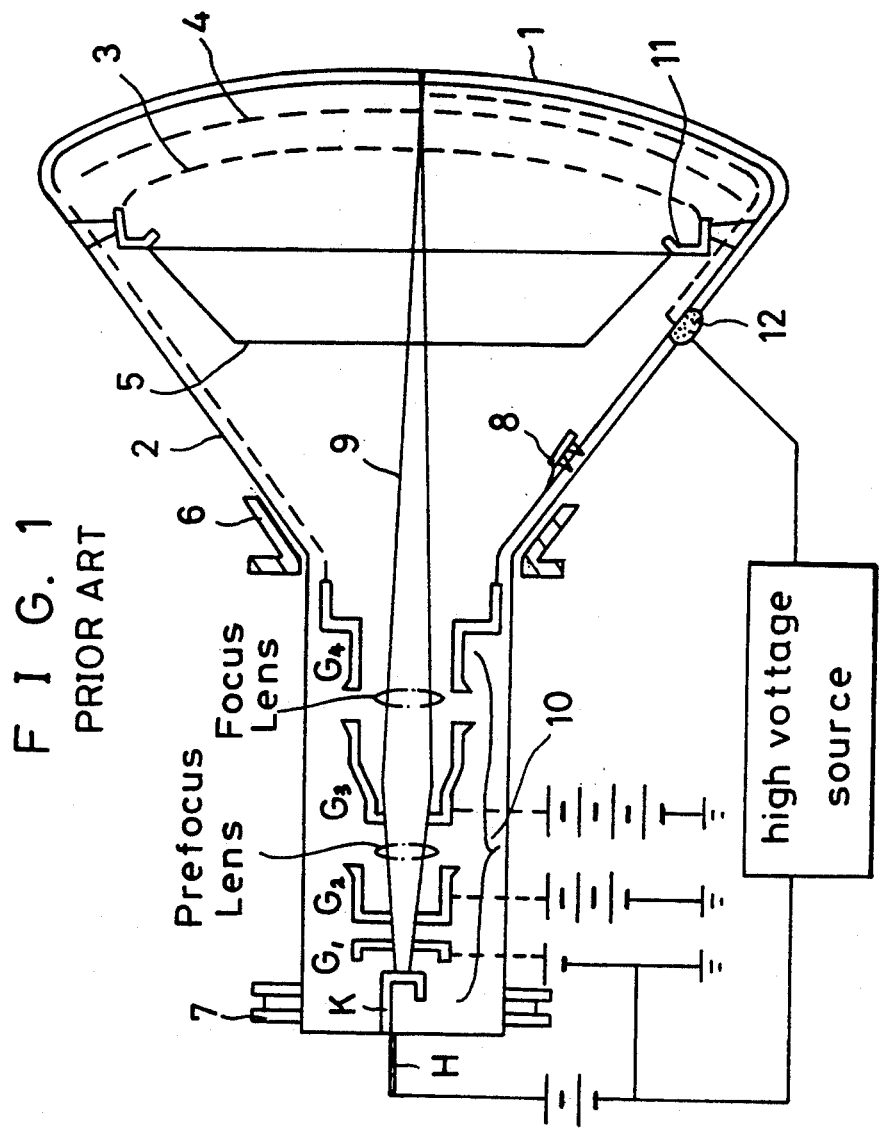
FIG. 1 is a view illustrating a construction of a conventional cathode ray tube.

The operation and construction of the cathode ray tube 20 in FIG. 4 are the same as those in FIG. 1 and a description thereof will thus be omitted.

The operation of the construction in FIG. 4 will hereinafter be described with reference to FIG. 5a, 5b and 5c which is a timing chart of signals from the components in the circuit in FIG. 4 in accordance with the present invention.

First, upon power-on of the system (for example, a television receiver or a monitor), a signal as shown in FIG. 5A is rectified through the diode D1 in the second switch 25b and applied to the relay coil 25b1 therein and also rerectified through the diode D2 in the charging and discharging section 23. At this time, upon application of the rectified voltage, the relay contact 25b2 in the second switch 25b is turned off (i.e., open state) since it is of B type.

On the other hand, a signal as shown in FIG. 5B is applied to the capacitor C1 in the charging and discharging section 23, thereby causing the constant voltage CV to be charged on the capacitor C1. As the relay contact 25b2 in the second switch 25b is turned off, the relay coil 25a2 in the first switch 25a is nonconductive and the relay contact 25a2 therein is turned off (i.e., open state) since it is of A type.

Upon power-off of the system under these conditions, a signal as shown in FIG. 5C is applied to the relay coil 25b1 in the second switch 25b, thereby causing the B type relay contact 25b2 therein to be turned on (i.e., closed state). At this time, the voltage CV charged on the capacitor C1 in the charging and discharging section 23 begins to be discharged. In other words, the charged voltage CV is applied as the drive voltage DV to the relay coil 25a1 in the first switch 25a through the relay contact 25b2 in the second switch 25b.

Figure 2:
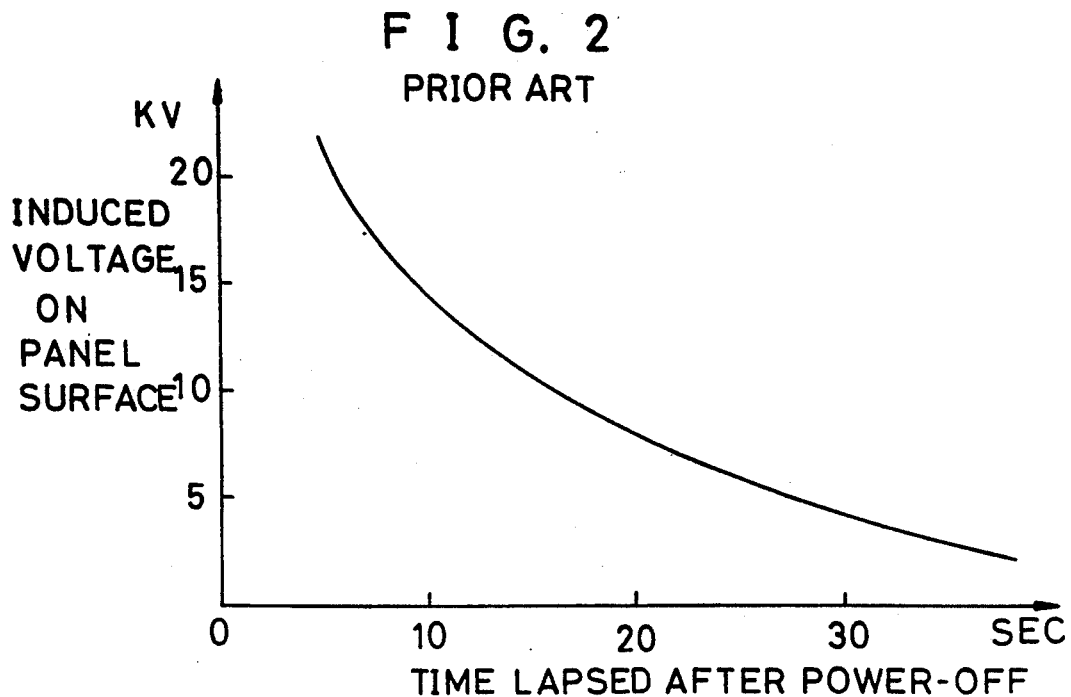
FIG. 2 is a graph illustrating the natural discharge of the residual high voltage in the cathode ray tube with the lapse of time after power-off of a system having the cathode ray tube, in accordance with the prior art.

As the relay coil 25a1 in the first switch 25a is driven by the drive voltage DV, the A type relay contact 25a2 therein is turned on (i.e., closed state), thereby causing the anode cap 12, to which the high voltage of about 30 KV is applied, to be connected to the ground. As a result, the residual high voltage in the cathode ray tube 20 is discharged at high speed, as shown in FIG. 6. As compared with FIG. 2, FIG. 6 shows that the residual high voltage is discharged at a much higher speed according to the present invention.

As mentioned previously, the prior art attempts were to remove the stray electron sources, which are the origin of the stray emission phenomenon, in the manufacturing process of the cathode ray tube. In the prior art attempts, however, there was a limit to perfectly removing the stray electron sources themselves due to other factors.

Therefore, as hereinbefore described, according to the present invention, provided on the circuit board of the system is a circuit capable of discharging the residual high voltage in the cathode ray tube within a short time period upon the power-off of the system, thereby resulting in the removal of a potential difference in the cathode ray tube. As a result, stray emission phenomenon is eliminated on the screen although the stray electrons are present in the cathode ray tube.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A stray emission prevention circuit for a system having a cathode ray tube comprising:
    charging and discharging means for applying a system power supply voltage to charge the system with a constant voltage upon activation of the system and for discharging the charged voltage upon deactivation of the system; and
    switching means for forming an open circuit between a high voltage unit of the cathode ray tube and a ground upon the activation of the system and for forming a closed circuit between the high voltage unit and the ground in response to the discharge of the charged voltage upon the deactivation of the system to discharge the residual high voltage in the cathode ray tube, said charged voltage acting as a drive voltage to form the closed circuit.

2. The circuit according to claim 1, wherein said switching means includes:
    a first switch for forming the closed circuit between said high voltage unit of the cathode ray tube and the ground at times when the drive voltage is applied thereto and for forming the open circuit between the high voltage unit and the ground at times when the drive voltage is not applied thereto; and
    a second switch for forming an open circuit between said charging and discharging means and said first switch upon the activation of the system and for forming a closed circuit between the charging and discharging means and the first switch upon the deactivation of the system to apply the charged voltage as the drive voltage to said first switch.

3. The circuit according to claim 2, wherein said first switch includes:
    a relay coil; and
    a relay contact, said relay contact being closed at times when the drive voltage is applied to said relay coil and being open at times when the drive voltage is not applied to said relay coil.

4. The circuit according to claim 2, wherein said second switch includes:
    a diode for rectifying the power supply voltage applied upon the activation of the system;
    a relay coil for receiving the rectified voltage from said diode as a drive voltage thereto; and
    a relay contact being open at times when the drive voltage is applied to said relay coil and being closed at times when the drive voltage is not applied to said relay coil.

5. The circuit according to claim 1, wherein said charging and discharging means includes:
    a diode for rectifying the power supply voltage applied upon the activation of the system; and
    a capacitor for being charged with the rectified voltage from said diode.

* * * * *